2,725,365
Patented Nov. 29, 1955

2,725,365
COLORED COMPOSITION OF VINYL CHLORIDE RESINS

William E. Leistner and Olga H. Knoepke, Brooklyn, N. Y., assignors to Argus Chemical Laboratory, Inc., a corporation of New York No Drawing. Application December 8, 1952, Serial No. 324,816

2 Claims. (Cl. 260—41)

This invention relates to a new colorant for vinyl chloride polymer resins and copolymer resins. As hereinafter used the term vinyl chloride resins shall be understood to include both the homopolymers and the copolymers of vinyl chloride.

Polyvinyl chloride compositions have found many useful applications because of their wide range of physical and mechanical properties. Typical of such applications are calendered films and sheetings for shower curtains, window shades, apparel, floor coverings, upholstery and inflatables. Polyvinyl chloride compositions have found wide utility as coatings on textiles and paper. Other large applications are in the production of water hose, rigid chemical-resistant pipe, electric wire, and molded articles, such as dolls and toys. In most cases, color is a very important factor in the ultimate utilization by the consumer.

The colorants normally used by the trade in polyvinyl chloride compositions are many. These include inorganic pigments, such as the chrome yellows, chrome greens, titanium dioxide, iron oxides, cadmium reds, etc., and the organic pigments, such as phthalocyanines, toluidines, BON reds, lithol reds, etc.

Generally speaking, commercial pigments in most colors are available which are fast to the degradation of heat and light. The notable exceptions, however, are the red shades. There are no organic red pigments on the market today which are considered as stable as, say, the phthalocyanine blues or greens in polyvinyl chloride compositions.

The major difficulty in producing stable organic pigments for use in polyvinyl chloride compositions lies in the resin itself. Organic pigments are generally finished so that they are stable to either acid media or alkaline media. It is extremely difficult to produce an organic pigment resistant to both alkali or acid conditions.

With vinyl chloride resins, the action of heat and of light causes a degradation of the resin. The degradation products are strongly acidic. Because of this, the normal practice is to include in the vinyl chloride resin composition, stabilizers which neutralize the acid product as it forms. The stabilizers are usually basic in nature. Thus, for an organic pigment to be stable, it must not be affected by elevated temperatures, by light, or by acidic or basic conditions.

We have discovered an organic red pigment which is exceptionally stable in polyvinyl chloride compositions. This is the nickel salt of dimethyl glyoxime. This pigment can be used alone or in combination with other pigments. It is compatible with the polyvinyl chloride resin and does not bloom, crock or bleed.

In the following, a few examples will be given to illustrate the invention, but it should be understood that they are given by way of illustration and not of limitation and that many modifications may be made without departing from the spirit of the invention.

Example 1

A saturated solution of dimethylglyoxime in ethanol is slowly added to a dilute aqueous solution of a soluble nickel salt made slightly alkaline with ammonia. The nickel salt of dimethylglyoxime is formed almost quantitatively

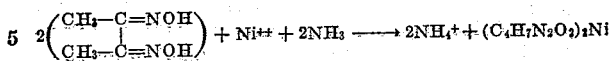

The precipitate is separated from the mother liquor by filtration and is washed several times with water. The excess water is removed by suction and the salt dried at slightly elevated temperatures.

Example 2 a. 100 parts of Vinylite VYNW (a vinyl chloride and vinyl acetate copolymer), 45 parts of dioctyl phthalate, 2 parts of Stabilizer Mark XI (barium-cadmium laurate), 1 part Stabilizer Mark XX (organic chelating agent) and 2 parts of the nickel salt of dimethylglyoxime made as in Example 1 are mixed in a dry blender for one hour. The mixture is then transferred to a Banbury mixer and fused in about 10 minutes at approximately 300° F. The mass is then transferred to a warmup mill whose roll temperature is maintained at 290° F. The compound is then fed as needed to a 4 roll inverted "L" calender. The temperature of the rolls ranged from 270° to 310° F. The vinyl compound is thus converted to a translucent red, flexible film 0.004 inch thick.

b. For comparison purposes, the same procedure is followed as in Example 2a, except that 2 parts of Lithol Rubin Red is used.

Example 3

2" x 6" strips of each of the films made in Example 2a and Example 2b are placed on a glass plate and exposed to heat for 75 minutes at 330° F. in an electrically heated convection oven. At the end of the period, the samples are examined. The strip of film containing the Lithol Rubin Red turned to a dark reddish brown, whereas the film containing the nickel salt of dimethylglyoxime was virtually unchanged in color.

Samples of each of the films made in Example 2a and Example 2b were placed in an Atlas Fadeometer and exposed for 750 hours. At the end of the period, the test pieces were removed and examined. The sample containing the Lithol Rubin Red had turned from its original blue red hue to a faded yellow red. The sample with Ni-dimethyl-glyoxime remained virtually unchanged.

Example 4

100 parts of Geon 101 (a vinyl chloride polymer), 30 parts of dioctyl adipate, 10 parts of tricresyl phosphate, 5 parts of plasticizer (Paraplex G60) 2 parts of Stabilizer Mark XI, 1 part of Stabilizer Mark XX, 5 parts of titanium dioxide, and 3 parts of the nickel salt of dimethylglyoxime made as in Example 1, are agitated by tumbling in a dry blender. The mixture is then transferred to a two-roll mill whose roll temperatures are at 300° F. The mixture is thoroughly fused and then taken off in small strips, which are then fed into the hopper of an extruder. By use of a suitable die, a tube with a wall thickness of ⅛ inch and an inside diameter of ¾ inch is extruded. This is suitable for water or garden hose.

Example 5

100 parts of Vinylite VYNS, 1 part of dibutyl tin dilaurate, 3 parts of titanium dioxide and 5 parts of the nickel salt of dimethyl glyoxime, made in Example 1, are agitated by tumbling in a dry blender. The mix is then transferred to a two-roll mill whose roll temperatures are at about 230° F., where it is fused. The compound is then taken off in strips and added to a tank equipped with suitable agitation and a jacket for heating, and which contains a solvent mixture of 3 parts of methyl ethyl ketone, 1 part of cyclohexanone and 1 part of toluol.

The solvent is maintained at a temperature slightly below the boiling point of the methyl ethyl ketone until the vinyl compound is dissolved. The solution is then cooled and removed. The result is a red vinyl solution which is suitable as a printing ink for vinyl chloride films.

*Example 6*

100 parts of Geon 121 (a vinyl chloride paste resin) 70 parts of dioctyl phthalate, 20 parts of plasticizer (Paraplex 571), 10 parts titanium dioxide ground in an equal quantity of dioctyl phthalate, 10 parts of the nickel salt of dimethyl glyoxime ground in an equal quantity of dioctyl phthalate are added to a Pony Mixer and stirred for one hour. A red, viscous paste results. The paste is allowed to stand to permit the air bubbles to escape. A quantity is poured into a suitable mold. The mold is then heated for 5 minutes at 400° F. and then cooled to room temperature. The mold is then opened and a red vinyl article is removed.

While the proportion of the colorant may vary considerably according to the shade of red desired, it may be stated that in general we use amounts of nickel dimethyl glyoxime ranging from 0.1 to 10% of the total composition.

What we claim is:

1. A composition of matter comprising a vinyl chloride resin and the nickel salt of dimethyl glyoxime as a colorant.

2. A composition of matter comprising a vinyl chloride resin and the nickel salt of dimethyl glyoxime as a colorant in an amount of 0.1–10% by weight of the total composition.

References Cited in the file of this patent

Thorpe's Dictionary of Applied Chemistry, 4th edition (1947), page 474.

Brelstein, page 398, of 1927, Supplement to vol I.